United States Patent [19]

Heggie

[11] 4,038,868

[45] Aug. 2, 1977

[54] TRANSDUCER FOR MEASURING INJECTION PRESSURES OF DIESEL ENGINES

[75] Inventor: William S. Heggie, Bell's Corners, Canada

[73] Assignee: Canadian Patents and Development Limited, Ottawa, Canada

[21] Appl. No.: 732,402

[22] Filed: Oct. 14, 1976

[51] Int. Cl.² .................... G01M 15/00; G01L 9/04
[52] U.S. Cl. ..................... 73/119 A; 73/398 AR; 338/4
[58] Field of Search ............... 73/398 AR, 88.5 SD, 73/119 A, 115, 141 A; 338/4

[56] References Cited

U.S. PATENT DOCUMENTS

| 3,937,212 | 2/1976 | Fletcher et al. | 73/88.5 SD |
| 3,939,703 | 2/1976 | Heggie | 73/115 |

Primary Examiner—Donald O. Woodiel
Attorney, Agent, or Firm—J. R. Hughes

[57] ABSTRACT

A transducer for mounting on the rocker arm used for operating the unit injectors of diesel engines comprising a bowed strip of metal, a strain gauge element rigidly attached to a central portion of the inner or outer surface of the bowed element, an encapsulation layer of epoxy resin covering the strain gauge element and the bowed strip over most of its central extent, the ends of the bowed strip being adapted for rigid fixing into two openings spaced apart in the longitudinal direction in the surface of the rocker arm structure of a diesel engine.

4 Claims, 3 Drawing Figures

TRANSDUCER FOR MEASURING INJECTION PRESSURES OF DIESEL ENGINES

This invention relates to a transducer for measuring injection pressures of diesel engines.

In U.S. Pat. No. 3,937,087 issued Feb. 10, 1976, to William S. Heggie, a transducer for engine fuel injection monitoring is described. In this device the transducer is mounted on the circumference of the fuel line tube such as to measure expansion and contraction of the tube and thus give a pressure-time history of the fuel injection cycle of the diesel engine. There are however, certain types of diesel engines that have unit fuel injectors and thus no pressure lines. This means that the type of transducer described in the above mentioned patent would not be applicable.

It is an object of the present invention to provide a transducer for measuring pressure-time histories of diesel engines of the type having unit fuel injectors operated by a rocker arm.

This and other objects of the invention are achieved by a transducer for mounting on the rocker arm used for operating the unit injectors of diesel engines comprising a bowed strip of metal, a strain gauge element rigidly attached to a central portion of the inner or outer surface of the bowed element, an encapsulation layer of epoxy resin covering the strain gauge element and the bowed strip over most of its central extent, the ends of the bowed strip being adapted for rigid fixing into two openings spaced apart in the longitudinal direction in the surface of the rocker arm structure of a diesel engine.

In U.S. Pat. No. 3,939,703 issued Feb. 24, 1976, to the present applicant, an apparatus for measuring engine cylinder pressures is described. This device involves a bowed strip of metal mounted between dowels or rods mounted in openings in the engine head and block and with transducers mounted on the bowed portion of the metal strip. U.S. Pat. No. 3,937,212 issued Feb. 10, 1976 to James C. Fletcher, Administrator of the National Aeronautics and Space Administration describes a miniature muscle displacement transducer consisting of a curved beam of high elastic compliance connected at its ends to two prongs. Neither of the devices in these two patents could be adapted and used for the purpose of the present application.

In the drawings which illustrate an embodiment of the invention,

Figure 1:
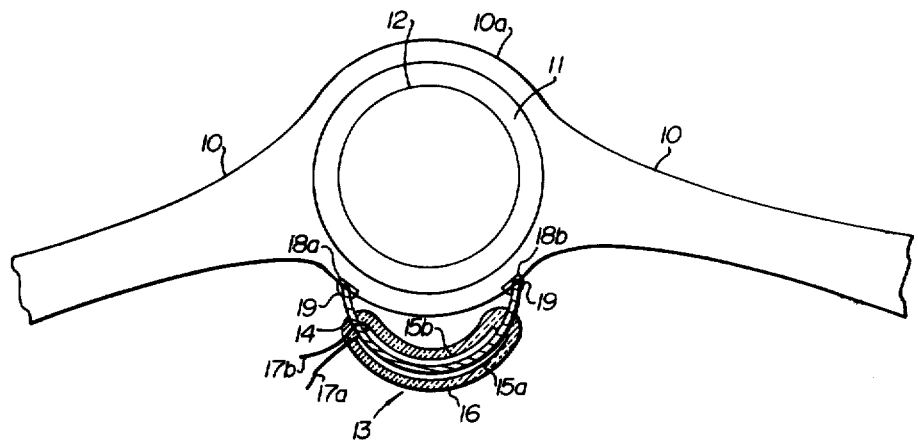
FIG. 1 is a cross-sectional view of the transducer mounted on a rocker arm.

Referring to FIG. 1, a rocker arm 10 with a bearing 11 of a diesel engine is rotatably mounted on a shaft 12. One end is operated by a push rod (not shown) and the other bears against and operates the plunger of the unit fuel injector of the engine (not shown). It has been found that if a measurement of the strains (expansion and contraction) of the inner side of the rocker arm boss (hub, bearing housing) 10a is made then a time-pressure history may be obtained. A transducer 13 made up of a curved beam 14 of a flexible material, e.g. aluminum, steel, certain plastics, has sensitive strain gauge elements 15a and 15b attached to both inner and outer surfaces. These elements may be the resistive type (resistance strain gauge), the capacitive type, or a piezoelectric crystal. The elements are clamped to the metal strip and protected by an overall encapsulation 16 with high temperature epoxy resin material which encases the elements and extends over most of the length of the curved metal strip. Electric leads 17a and 17b pass from the elements through the encapsulation to the exterior where they are available for attachment to measuring and indicating circuitry and apparatus. Although it is preferable to use two elements, one on the inner and one on the outer surface of the beam, one on either surface would provide a reasonable output.

Figure 2:
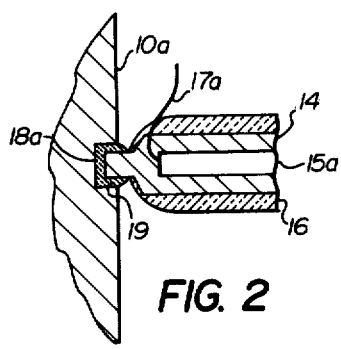
FIG. 2 is a cross-sectional view of an end of the transducer of FIG. 1.

As shown in FIG. 2, the beam width of the metal strip 14 is reduced at its ends which allows entry into two shallow holes 18a and 18b formed in the underside of the rocker bearing boss. The ends are firmly retained in the holes by cementing with epoxy resin material 19. It will be seen that the encapsulation and the end cementing cover all or nearly all of the extent of the metal beam with little or no portion of it left free.

It has been found that the position indicated for attachment of the transducer is best as measurements obtained do not exaggerate but are substantially equal to mechanical dynamic effects reflected by hydraulic pressure. Readings are possible if the transducer is attached to the outer side of the rocker arm boss (away from the engine) but are not as good as the portion of the arm is under compression during the injection (pressure pulse) period. Readings of some value could be obtained from a mounting along one of the rocker arms.

Figure 3:
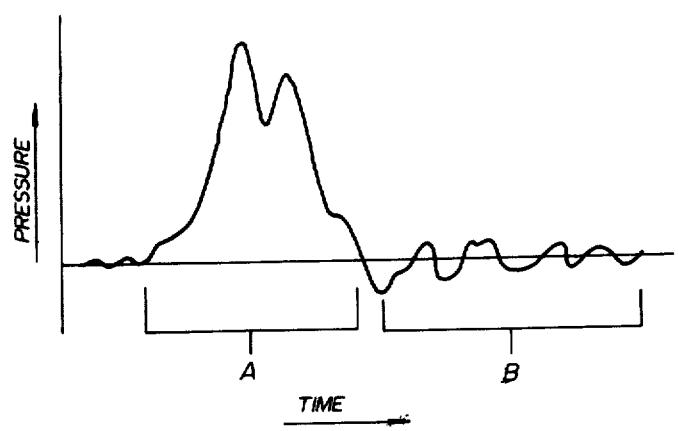
FIG. 3 is a graph showing a typical fuel injection signature obtained from the transducer.

FIG. 3 is a graph showing a typical fuel injection time-pressure signature. The waveform over the period A indicates the positive pressure pulse and the higher frequency reflections are shown at B. These later die away until a new pressure pulse arrives. These signatures are characteristic to individual engines and are highly useful for analysis of engine operation and efficiency. Changes in the signature would forewarn engine breakdown. In addition, the fast rise-time of the pulse at A may be highly useful for engine timing purposes.

I claim:

1. A transducer for measuring injection pressure of diesel engines of the type having unit fuel injectors operated by a rocker arm having a boss or hub rotatably mounted on a bearing shaft on the engine head comprising:
   a. a bowed strip of flexible material;
   b. a strain gauge element rigidly attached to a central portion of the inner or outer surface of the bowed strip such as to measure surface strain of the strip and thus the amount of bowing;
   c. an encapsulation layer of epoxy resin covering the strain gauge element and the bowed strip over most of its central extent;
   d. electrical leads from the strain gauge element through the encapsulation layer to the exterior; and
   e. the ends of the bowed metal strip being adapted for rigid fixing into two openings formed in the inner or outer surface of the rocker arm and spaced apart in the longitudinal direction along the rocker arm.

2. A transducer as in claim 1 wherein the strain gauge element is formed of two elements, one on the inside and the other on the outside of the bowed strip.

3. A transducer for measuring injection pressure of diesel engines of the type having unit fuel injectors operated by a rocker arm having a boss or hub rotatably mounted on a bearing shaft on the engine head comprising:

a. two openings formed in the inner or outer surface of the boss or hub of the rocker arm and spaced apart in the circumferential direction around the said boss and shaft;
b. a bowed strip of metal;
c. a strain gauge element rigidly attached to a central portion of the inner or outer surface of the bowed strip such as to measure surface strain of the strip and thus the amount of bowing;
d. an encapsulation layer of epoxy resin covering the strain gauge element and the bowed strip over most of its central extent;
e. electrical leads from the strain gauge element through the encapsulation layer to the exterior;
f. the ends of the bowed metal strip being positioned in the said two openings; and
g. epoxy resin surrounding the ends of the bowed strip in the openings such as to rigidly fix the ends in the rocker arm.

4. A transducer as in claim 3 wherein the strain gauge element is formed of two elements, one on the inside and the other on the outside of the bowed strip and the two openings are formed on the inside surface of the rocker arm hub or boss.

* * * * *